(12) United States Patent
Chen et al.

(10) Patent No.: US 9,740,956 B2
(45) Date of Patent: Aug. 22, 2017

(54) METHOD FOR OBJECT SEGMENTATION IN VIDEOS TAGGED WITH SEMANTIC LABELS

(71) Applicant: BEIHANG UNIVERSITY, Beijing (CN)

(72) Inventors: Xiaowu Chen, Beijing (CN); Yu Zhang, Beijing (CN); Jia Li, Beijing (CN); Qinping Zhao, Beijing (CN); Chen Wang, Beijing (CN); Changqun Xia, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/084,405

(22) Filed: Mar. 29, 2016

(65) Prior Publication Data

US 2016/0379371 A1 Dec. 29, 2016

(30) Foreign Application Priority Data

Jun. 29, 2015 (CN) .......................... 2015 1 0368762

(51) Int. Cl.
  *G06K 9/34* (2006.01)
  *G06K 9/46* (2006.01)
  *G06T 7/12* (2017.01)

(52) U.S. Cl.
  CPC .............. *G06K 9/4604* (2013.01); *G06T 7/12* (2017.01); *G06K 2209/21* (2013.01); *G06T 2207/10016* (2013.01)

(58) Field of Classification Search
  CPC .... G06K 9/4604; G06K 2209/21; G06K 9/38; G06T 7/12; G06T 2207/10016; G06T 7/0081; G06T 2207/20144; G06T 7/0083
  USPC ....... 382/155, 159, 173, 180, 181, 224, 285, 382/305; 348/441
  See application file for complete search history.

(56) References Cited

U.S. PATENT DOCUMENTS

| | | | | |
|---|---|---|---|---|
| 5,542,284 A | * | 8/1996 | Layzell | .............. G01N 33/0006 73/23.2 |
| 5,930,783 A | * | 7/1999 | Li | ..................... G06F 17/30256 |
| 7,840,059 B2 | * | 11/2010 | Winn | .................... G06K 9/3233 382/155 |
| 8,442,309 B2 | * | 5/2013 | Ranganathan | ....... G06K 9/4676 382/155 |
| 8,503,768 B2 | * | 8/2013 | Zhang | ................ G06K 9/00684 382/159 |

(Continued)

*Primary Examiner* — Sheela C Chawan
(74) *Attorney, Agent, or Firm* — J. C. Patents

(57) ABSTRACT

The present invention provides a method for object segmentation in videos tagged with semantic labels, including: detecting each frame of a video sequence with an object bounding box detector from a given semantic category and an object contour detector, and obtaining a candidate object bounding box set and a candidate object contour set for each frame of the input video; building a joint assignment model for the candidate object bounding box set and the candidate object contour set and solving the model to obtain the initial object segment sequence; processing the initial object segment, to estimate a probability distribution of the object shapes; and optimizing the initial object segment sequence with a variant of graph cut algorithm that integrates the shape probability distribution, to obtain an optimal segment sequence.

8 Claims, 5 Drawing Sheets

(56) References Cited

U.S. PATENT DOCUMENTS

| | | | |
|---|---|---|---|
| 8,543,380 B2* | 9/2013 | Marvit | G06F 17/2735 358/1.9 |
| 8,824,797 B2* | 9/2014 | Salamati | G06T 7/0087 382/159 |
| 9,396,546 B2* | 7/2016 | Price | G06T 7/0081 |

* cited by examiner

METHOD FOR OBJECT SEGMENTATION IN VIDEOS TAGGED WITH SEMANTIC LABELS

CROSS-REFERENCE TO RELATED APPLICATION

This application claims priority to the Chinese Patent Application No. 201510368762.1, filed on Jun. 29, 2015, which is incorporated herein by reference in its entirety.

TECHNICAL FIELD

The present invention relates to the field of computer technology and, more particularly, to a method for object segmentation in videos tagged with semantic labels.

BACKGROUND

Video object segmentation is a technique for detecting and segmenting an object region of a given semantic category from the video, which is a fundamental technique in the field of computer vision and multimedia analysis, and plays an important role in application aspects such as object retrieval, video editing and video-based three-dimensional modeling. A weakly-labeled method for segmenting video objects refers to a method in which only a semantic category of the video object is labeled by a user, and an object belonging to a category specified by the user is detected and segmented with an algorithm. Considering that most of the Internet videos usually have a user flag, and a semantic tag relevant to the content, therefore, the weakly-labeled method for segmenting video objects is of great importance in the application of analyzing and processing ever-increasing internet video data.

Since a weakly-labeled video object has a feature that, it is only known about that there is an object belonging to a specified semantic category in the input video, but the specific location information is still unknown. Currently, the most widely adopted solution is based on weakly supervised learning, which particularly is: firstly, positive videos and negative videos are collected, wherein, the positive videos contain the objects from a pre-specified semantic category while the negative videos do not contain any objects from this category; secondly, each video is segmented into spatio-temporal segments, and a semantic category of each spatio-temporal segment is determined according to the association between the positive videos and the negative videos; finally, the positive videos and the negative videos are all co-segmented with a multi-graph optimization model to obtain a segmentation result, that is, the objects belonging to the specified semantic category in the input video.

The above method for segmenting video objects based on weakly-supervised learning can effectively solve the problem of segmenting a video object under a weakly-labeled condition in some cases, however, since that a weakly-labeled video lacks location information of an object of a specific semantic category, which makes the classification of the positive sample video and the negative sample video inaccurate, and thus a wrong result of video segmentation during segmentation is most likely to occur, in addition, multiple videos are simultaneously needed as the input for segmentation, which renders these methods not applicable for segmenting a semantic category object of a single input video.

SUMMARY

The present invention provides a method for object segmentation in videos tagged with semantic labels, to assist segmentation of an object of a given semantic category in a video by means of an object bounding box detector and an object contour detector, so that the problem that the existing method for segmenting video objects is inaccurate and not applicable to segmenting a semantic category object of a single input video can be solved.

According to the present invention, there is provided a method for object segmentation in videos tagged with semantic labels, including:

detecting each frame of the video sequence with an object bounding box detector of the given semantic category, and an object contour detector and obtaining a candidate object bounding box set and a candidate object contour set for each frame of the input video;

building a joint assignment model for the candidate object bounding box set and the candidate object contour set, and solve this model to obtain the initial object segment sequence, wherein at least one of the initial segment sequences contains the object;

processing the initial object segment sequence, to estimate a probability distribution of the object shapes in the input video; and optimizing the initial object segment sequence with a variant of graph cut algorithm that integrates the shape probability distribution of the object, to obtain the optimal object segment sequence corresponding to the object in the input video.

The present invention provides a method for object segmentation in videos tagged with semantic labels, to assist segmentation of an object of a given semantic category in an input video by applying an object bounding box detector and an object contour detector, so that the problem of ambiguous video segment classification under a weakly-supervised learning condition can be avoided, further, the method for object segmentation in videos tagged with semantic labels in the present invention is applicable to segmenting an object of a given semantic category of a single input video, not having to process multiple videos at the same time, and thus has a better applicability.

BRIEF DESCRIPTION OF DRAWINGS

In order to illustrate embodiments of the present invention or the technical solutions in the prior art more clearly, accompanying drawings needed for describing the embodiments or the prior art will be introduced in brief hereinafter. Apparently, the accompanying drawings show certain embodiments of the invention, and persons skilled in the art can derive other drawings from them without creative efforts.

DESCRIPTION OF EMBODIMENTS

Figure 1:
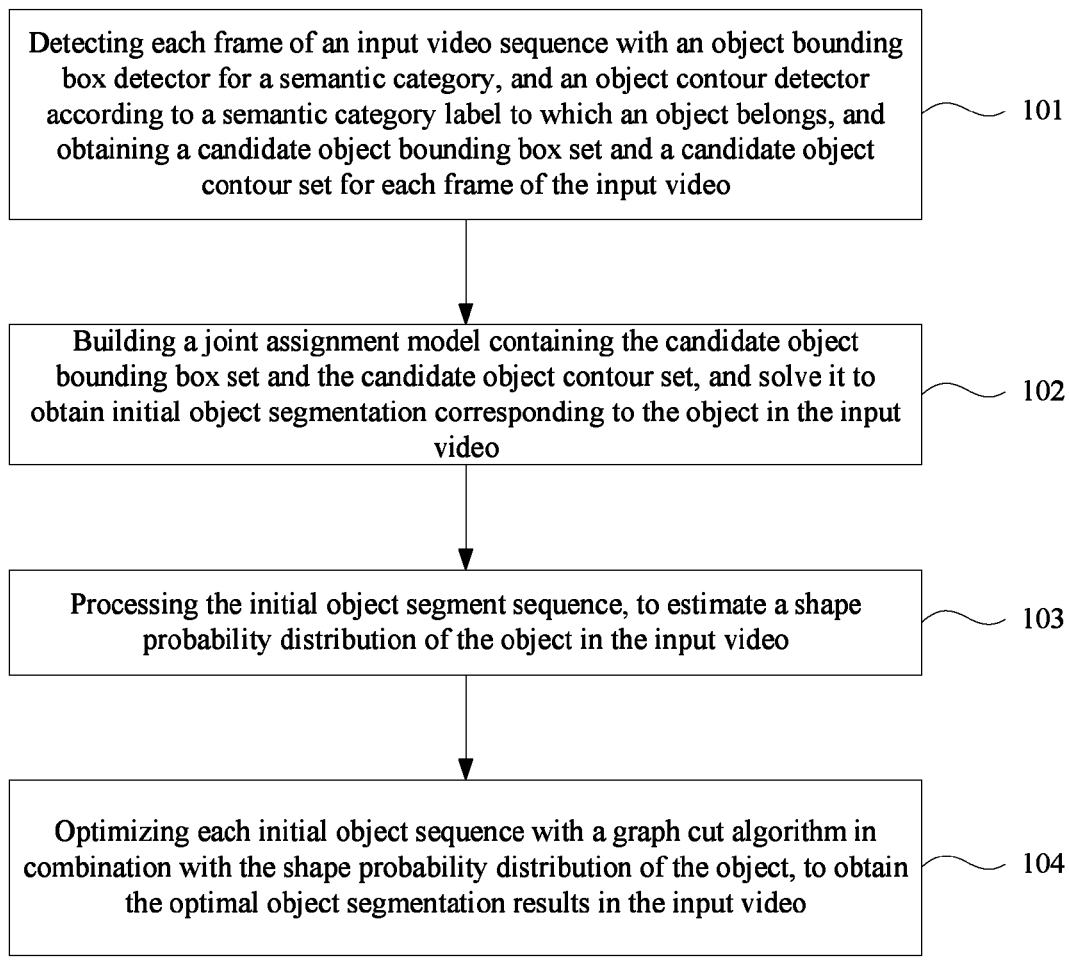
FIG. 1 is a flow chart of a method for segmenting video objects tagged with semantic labels according to Embodiment 1 of the present invention.

In order to make the objects, technical solutions, and advantages of the embodiments of the present invention clearer, the technical solutions in the embodiments of the present invention are hereinafter described clearly and completely with reference to the accompanying drawings in the embodiments of the present invention. Obviously, the embodiments described here are part of the embodiments of the present invention but not all of the embodiments. Based on the embodiments of the present invention, other embodiments obtained by those skilled in the art without creative efforts all fall in the scope of the present invention.

Video object segmentation is a technique for detecting and segmenting an object region of a given semantic category from the video, which is a fundamental technique in the field of computer vision and multimedia analysis, and plays an important role in application aspects such as object retrieval, video editing and video-based three-dimensional modeling.

Currently, depending on different user input conditions, the existing method for segmenting semantic video objects is mainly divided into three general categories: a label-free method for segmenting video objects, a strongly-labeled method for segmenting video objects, and a weakly-labeled method for segmenting video objects. In the label-free method for segmenting video objects, an algorithm can automatically segment semantic objects from a video, which does not need user interaction; in the strongly-labeled method for segmenting video objects, the user needs to manually segment objects in several key frames of the input video, an algorithm can propagate the segmentation result on the remaining frames, so that the semantic object can be segmented from the whole input video; in the weakly-labeled method for segmenting video objects, the user only needs to label a semantic category to which object in the input video belongs to, an algorithm is used to detect and segment objects of the specified semantic category from the input video. Considering that most of the Internet videos usually have semantic tags annotated by users relevant to the content, therefore, the weakly-labeled method for segmenting video objects is of great importance in the application of analyzing and processing ever-increasing internet video data.

Under a weakly-labeled condition, it is only known that there is an object belonging to a specified semantic category in the input video, while location information of the object is still unknown. In order to solve this problem, a vision model based on weakly-supervised learning is mainly adopted for solution in the relevant research field, which particularly is: in the framework of weakly-supervised learning, positive videos and negative videos are firstly collected, wherein, the positive videos contain objects from a specific semantic category while the negative videos do not contain any objects from that category; secondly, each video is segmented into spatio-temporal segments (Spatio-temporal Segment), and a semantic category of each spatio-temporal segment is solved according to the visual similarity between the segments in the positive and negative videos; for example, Hartmann learns a segment-based classifier with a linear support vector machine (Linear SVM) and multi-instance boosting (MI-Boosting), and detects an object region of a given semantic category in the input video; Tang et al uses a negative mining method, that is to compare each segment of the positive videos with all the segments of the negative videos, score each segment of all the positive videos according to a neighbor relationship between the positive videos and the negative videos, and judge that the segment with a higher score belongs to a specified semantic category; Xiao et al propose to learn a distance measure between the positive videos and the negative videos with a weakly-supervised Hash algorithm, and give a probability that a video segment belongs to the given semantic category with a K-neighbor classifying method; finally, the positive videos and the negative videos are all co-segmented with a multi-graph optimization model to obtain a segmentation result, that is, the objects belonging to the specified semantic category in the input video.

The above method for segmenting video objects based on learning can effectively solve the problem of segmenting a video object under a weakly-labeled condition in some case, however, it still has two disadvantages as follows. Firstly, since a weakly-labeled video lacks location information of an object of a specific semantic category, therefore, a category to which a sample segment belongs can be speculated by comparing the appearance of the segment, which makes the classification of the sample segment always inaccurate (for example, two segments with similar appearances may either belong to the same semantic category or belong to different categories), thus makes the classification of the positive sample video and the negative sample video inaccurate. A wrong result of video segmentation is most likely to occur due to such fuzzy sample classification. Secondly, multiple videos are needed as the input for segmentation in the method for segmenting video objects based on weakly-supervised learning, which is not applicable for segmenting object of a single input video.

Considering that the object detector has many successful application cases in the aspect of image semantic segmentation, for example, Xia et al achieves a highly-efficient image semantic segmentation method with an object detector, without the need of a complicated training process and a pixel-by-pixel accurately-labeled image training set. Therefore, in terms of an input video with a semantic category label, in order to solve the problem existed in the method for segmenting video objects based on weakly-supervised learning, the present invention proposes a method for object segmentation in videos tagged with semantic labels, the method firstly estimates a rough location of the video object with an object detector corresponding to a given semantic category, and on the basis of that, completes segmentation of objects belonging to the semantic category.

FIG. 1 is a flow chart of the method for object segmentation in videos tagged with semantic labels according to Embodiment 1 of the present invention, as shown in FIG. 1, the method includes:

Step 101, Detecting each frame of an input video sequence with an object bounding box detector for a semantic category, and an object contour detector according to a semantic category label to which an object belongs, and obtaining a candidate object bounding box set and a candidate object contour set for each frame of the input video;

Since there may be multiple objects belonging to different semantic categories in the input video, and under a weakly-labeled condition, it is only known that there is an object belonging to a specified semantic category in the input video, while location information of the object is still unknown, therefore, the present invention firstly estimates a rough location of the video object of a specified semantic category with an object detector, that is, detect each frame of the input video with an object bounding box detector first, obtain a candidate object bounding box set for each frame of the input video, and on the basis of the candidate object bounding box set, detect each frame of the input video with an object contour detector, obtain a candidate object contour set for each video frame.

Step 102, Building a joint assignment model containing the candidate object bounding box set and the candidate object contour set, and solve it to obtain initial object segmentation corresponding to the object in the input video; wherein, at least one of the initial segment sequences contains the object.

Since all the existing object detectors (object bounding box detectors and object contour detectors) are obtained by training on static images therefore, if applied in a video frame directly, the factors such as encoding compression, object occlusion and camera movement will cause that the detected candidate object bounding box set and candidate object contour set are in disorder and inaccurate.

To this end, by using a joint assignment model the present invention selects the right candidate object bounding boxes and candidate object contours from the noisy candidate object bounding box set and candidate object contour set The selected object contours correspond to the initial object segment sequence of a given semantic category label in the input video.

Step 103, Processing the initial object segment sequence, to estimate a shape probability distribution of the object in the input video;

As for the above initial object segmentation, the present invention proposes a method for estimating a shape probability distribution of the object which encodes spatio-temporal consistency, the method estimates the shape probability distribution of the object of a given semantic category in the input video, by analyzing statistical information of many candidate segment sequences that spatially overlapped with the above initial object segment sequence.

Step 104, Optimizing each initial object sequence with a graph cut algorithm in combination with the shape probability distribution of the object, to obtain the optimal object segmentation results in the input video.

Optimizing each sequence containing the object in the initial segmenting sequence in sequence with a graph cut algorithm in combination with the shape probability distribution of the object of a given semantic category solved in Step 103, to obtain an optimal segmenting sequence corresponding to the object in the input video.

Embodiments of the present invention provide a method for object segmentation in videos tagged with semantic labels, to assist segmentation of an object of a given semantic category in an input video by applying an object bounding box detector and an object contour detector, so that the problem of a fuzzy sample video classification under a weakly-supervised learning condition can be avoided, further, the method for object segmentation in videos tagged with semantic labels according to the present invention is applicable for segmenting an object of a given semantic category of a single input video, without the need of processing multiple videos at the same time, and thus shows better applicability.

Figure 2:
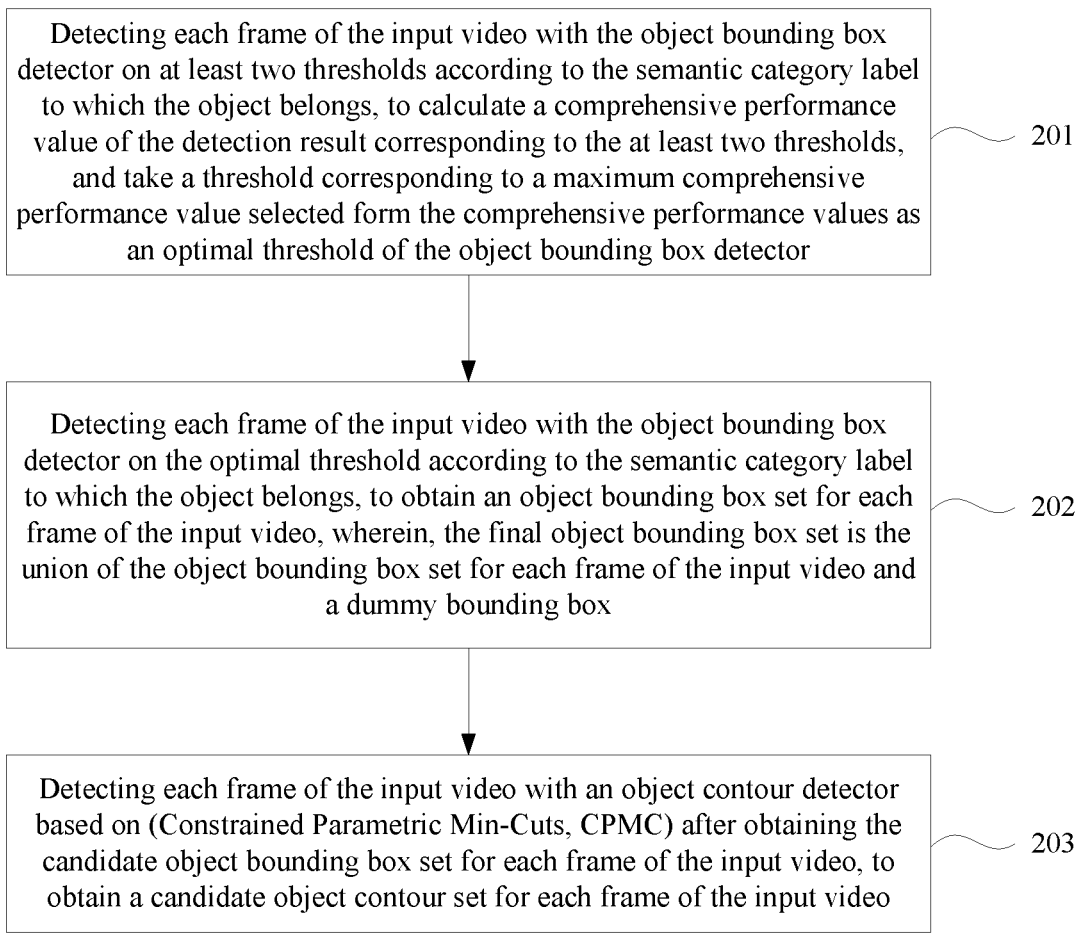
FIG. 2 is a flow chart of the method for segmenting video objects tagged with semantic labels according to Embodiment 2 of the present invention.

FIG. 2 is a flow chart of the method for segmenting video objects tagged with semantic labels according to Embodiment 2 of the present invention. Embodiment 2 of the present invention is to further discuss Step 101 on the basis of the technical solution of Embodiment 1. As shown in FIG. 2, the method for segmenting video objects tagged with semantic labels according to Embodiment 2 of the present invention, a specific implementation of Step 101 includes steps as follows:

Step 201, Detecting each frame of the input video with the object bounding box detector on at least two thresholds according to the semantic category label to which the object belongs, to calculate a comprehensive performance value of the detection result corresponding to the at least two thresholds, and take a threshold corresponding to a maximum comprehensive performance value selected form the comprehensive performance values as an optimal threshold of the object bounding box detector;

Since the user manually labels a given semantic category of an object on a training set of each frame of the input video under a weakly-labeled condition, therefore, comprehensive performance values with different magnitudes can be obtained when each frame of the input video is detected on different thresholds with an object bounding box detector, and a threshold corresponding to a maximum comprehensive performance value is selected as an optimal threshold of the object bounding box detector.

It should be noted that, the detection performance is measured by F-Score value, the F-Score value is also called F-Measure, which is a common evaluation criterion in the IR (information retrieval) field, the bigger F-Score is, the better the detection performance is. Therefore, the threshold corresponding to a maximum F-Score can be taken as the optimal threshold of the object bounding box detector.

Step 202, Detecting each frame of the input video with the object bounding box detector on the optimal threshold according to the semantic category label to which the object belongs, to obtain an object bounding box set for each frame of the input video, wherein, the final object bounding box set is the union of the object bounding box set for each frame of the input video and a dummy bounding box;

For example, if detect the t-th frame of the input frame with an object bounding box detector, an object bounding box set for the t-th frame is obtained, which is denoted as $D_t^+$, a candidate object bounding box set for the t-th frame contains $D_t^+$ and a dummy bounding box $D_\phi$, marked as $D_t = D_t^+ \cup \{D_\phi\}$. Particularly, the dummy bounding box $D_\phi$ is used to indicate an ideal area of the bounding box of the object.

It should be noted that, the existence of the dummy bounding box has a significance that, when the object bounding box detector fails to detect a certain frame, any detected bounding box in the obtained object bounding box set cannot locate on the object of the input video, if an dummy bounding box is not introduced, objects on the frame cannot be segmented accurately in the subsequent processing, that is, if all the object bounding box sets cannot locate on the object of the input video accurately, then, when the joint assignment model is built subsequently, the algorithm can only select a wrong detection for this frame as part of the solution, which will make the result inaccurate. With the dummy bounding box included, the algorithm can possibly choose the dummy bounding box instead of any of the others, which will not significantly influence the results.

However, the above problem can be solved to a certain extent with an assumption of the empty bounding box set, when all the object bounding box sets cannot locate on the object of the input video accurately, the algorithm of solving the initial segmenting sequence corresponding to the object can select an empty bounding box set first, and then select a better initial segmenting sequence.

It should be noted that, the joint allocation model built subsequently containing the candidate object bounding box set and the candidate object contour set joins the object bounding box set with the initial segmenting sequence, and allocation between the object bounding box set and the initial segmenting sequence is interdependent.

Step 203, Detecting each frame of the input video with an object contour detector based on (Constrained Parametric Min-Cuts, CPMC) after obtaining the candidate object bounding box set for each frame of the input video, to obtain a candidate object contour set for each frame of the input video.

Particularly, after knowing the candidate object bounding box set for the t-th frame of the input video, on the basis of the candidate object bounding box set, a heat map is computed by counting the number of detections on each pixel location in the frame. In order to improve the detection accuracy of the object contour detector, in the seed placement stage of constrained parametric min-cuts algorithm, additional foreground seeds are placed on the pixel locations with high detection hits. The detected object contours are denoted as $S_t$, for the t-th frame of the input video.

Before detecting each frame of the input video with the object contour detector, it is necessary to select seed points of the object contour detector, and the seed point indicates an optimal pixel region to be detected by the object contour detector.

In order to improve the detection accuracy of the object contour detector, additional foreground seed points are added as follows: detect the t-th frame of the input video with different object bounding box detectors having a lower threshold, to obtain a series of candidate object bounding boxes, and calculate times of each object pixel being covered by the candidate object bounding box, to obtain a heat map of detection results, that is, to obtain a pixel region of each object pixel covered by the candidate object bounding box; select a local maxima of the heat map as the additional foreground seed point, that is, the local maxima of the heat map is the optimal pixel region to be detected.

In the method for object segmentation in videos tagged with semantic labels according to Embodiment 2 of the present invention, select the optimal threshold of the object bounding box detector, so that the object bounding box detector detects each frame of the input video on the optimal threshold, to obtain an object bounding box set for each frame of the input video, and then detect each frame of the input video with an object contour detector based on constrained parametric min-cuts, to obtain a candidate object contour set for each frame of the input video, thus roughly determining a location of the object of a given semantic category, and improving accuracy of the subsequent video object segmentation.

Figure 3:
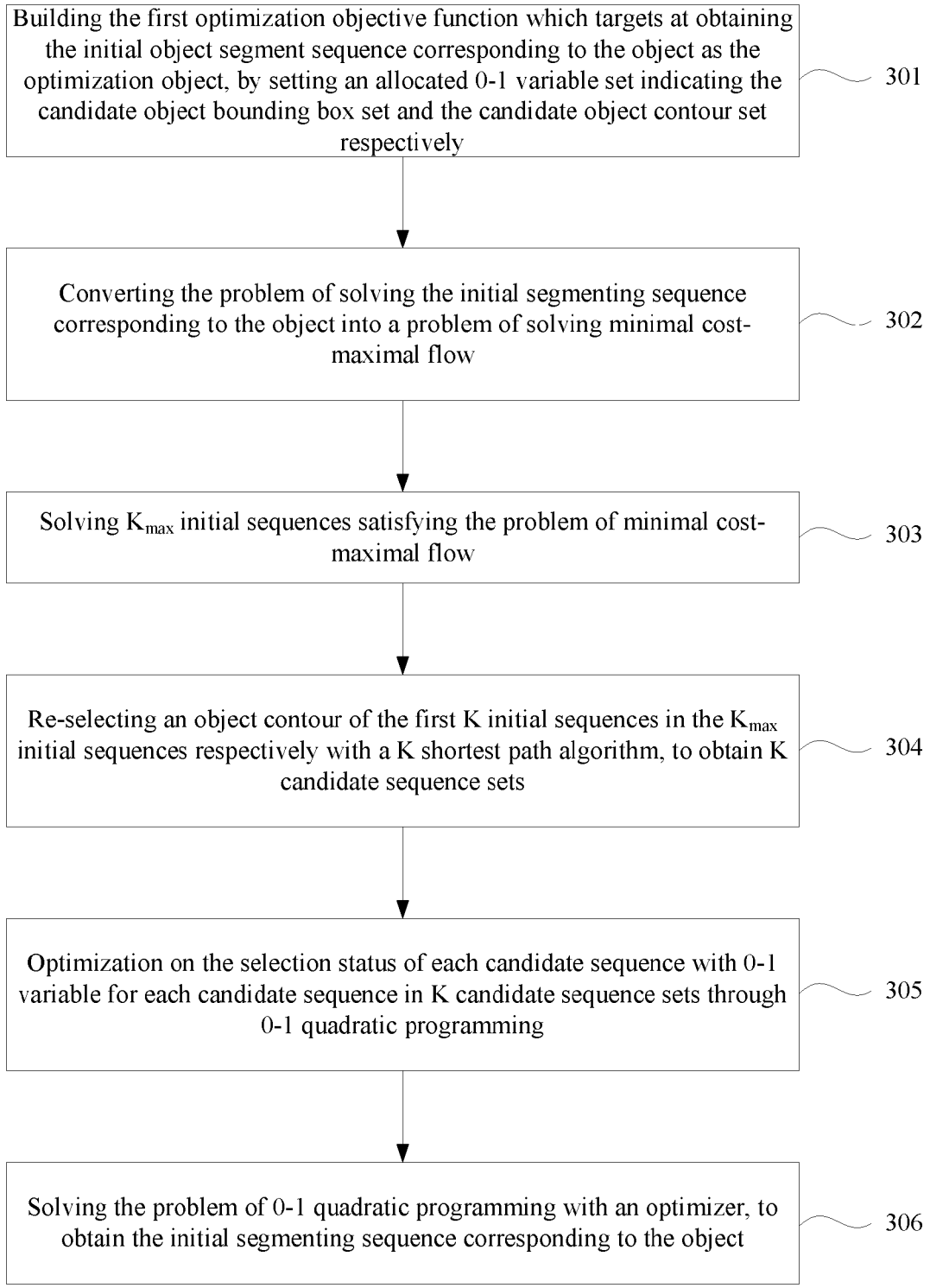
FIG. 3 is a flow chart of the method for segmenting video objects tagged with semantic labels according to Embodiment 3 of the present invention.

FIG. 3 is a flow chart of the method for object segmentation in videos tagged with semantic labels according to Embodiment 3 of the present invention. Embodiment 3 of the present invention is to further discuss Step 102 on the basis of the technical solution of Embodiment 1. As shown in FIG. 3, the method for object segmentation in videos tagged with semantic labels according to Embodiment 3 of the present invention, the Step 102, that is, building a joint assignment model containing the candidate object bounding box set and the candidate object contour set, to solve an initial segmenting sequence corresponding to the object in the input video, particularly includes:

Step 301, Building the first optimization objective function which targets at obtaining the initial object segment sequence corresponding to the object as the optimization object, by setting an allocated 0-1 variable set indicating the candidate object bounding box set and the candidate object contour set respectively;

Formalizedly, setting a set $A=\{a_D^k | \forall k, t, D \in D_t\}$ for the candidate object bounding box set, wherein $D_t$ indicates the candidate object bounding box set of the t-th frame of the input video, $a_D^k \in \{0,1\}$, when $a_D^k$ takes a value of 1, it means the bounding box D is assigned to the k-th sequence, and when $a_D^k$ takes a value of 0, it means the bounding box D is not assigned to the k-th sequence;

Likewise, setting a set $B=\{b_S^k | \forall k, t, S \in S_t\}$ for the candidate object contour set, wherein, $S_t$ indicates a candidate object contour set of the t-th frame of the input video, $b_S^k \in \{0,1\}$, when $b_S^k$ takes a value of 1, it means the contour S is assigned to the k-th sequence, and when $b_S^k$ takes a value of 0, it means the contour S is not assigned to the k-th sequence.

Building a first optimization objective function i.e., Formula (1), for obtaining the initial segment sequence corresponding to the object, constraint conditions of the objective function are Formula (2);

$$\min_{A,B} \{ L(A, B) + \lambda_1 \Omega_1(A, B) + \lambda_2 \Omega_2(B) \} \quad (1)$$

$$\begin{cases} a_D^k, b_S^k \in \{0, 1\}, \forall k, t, D \in D_t, S \in S_t \\ \sum_{D \in D_t} a_D^k = \sum_{S \in S_t} b_S^k \leq 1, \forall k, t \\ \sum_k a_D^k \leq 1, \sum_k b_S^k \leq 1, \forall t, D \in D_t, S \in S_t \\ \left(\sum_{D \in D_{t-m}} a_D^k\right)\left(1 - \sum_{D \in D_t} a_D^k\right)\left(\sum_{D \in D_{t+n}} a_D^k\right) = 0, \forall k, t, m, n \\ \sum_t \sum_{D \in D_t} a_D^k = \sum_t \sum_{S \in S_t} b_S^k \geq 1, \forall k, t \end{cases} \quad (2)$$

wherein, $L(A,B)$ is a loss function, indicating a confidence of the selected object bounding boxes object contours; $\Omega_1(A,B)$ is a penalty term, indicating a time domain smoothness of the selected object bounding boxes and object contours on adjacent t-th frame and t+1-th frame of the input video; $\Omega_2(B)$ is a penalty term, indicating the spatial overlap among the selected object contours in the different sequences; $\lambda_1$ is a parameter of the penalty term of $\Omega_1(A,B)$, and $\lambda_2$ is a parameter of the penalty term of $\Omega_2(B)$.

Theoretically, value ranges of the parameters $\lambda_1$ and $\lambda_2$ can be determined depending on an accuracy, optionally, in the embodiments of the present invention, the parameters $\lambda_1$ and $\lambda_2$ are respectively $\lambda_1=10$, $\lambda_2=1000$.

Further, the constraint conditions described above have restricting functions respectively as follows:

the constraint condition of $a_D^k, b_S^k \in \{0,1\}, \forall k, t, D \in D_t, S \in S_t$ is used to restrict value ranges of the variable $a_D^k$ of the set A and the variable $b_S^k$ of the set B;

the constraint condition of $$\sum_{D \in D_t} a_D^k = \sum_{S \in S_t} b_S^k \leq 1, \forall k, t$$

is used to restrict that each sequence can select at most one bounding box or contour on each frame of the input video;

the constraint condition of $$\sum_k a_D^k \leq 1, \sum_k b_S^k \leq 1, \forall t, D \in D_t, S \in S_t$$

is used to restrict that each bounding box or contour is assigned to at most one sequence;

the constraint condition of $$\left(\sum_{D\in D_{t-m}} a_D^k\right)\left(1 - \sum_{D\in D_t} a_D^k\right)\left(\sum_{D\in D_{t+n}} a_D^k\right) = 0, \forall k, t, m, n$$

is used to restrict the consecutiveness of the sequence, provided that the sequence must select a bounding box or contour on continuous video frames;

the constraint condition of $$\sum_t \sum_{D\in D_t} a_D^k = \sum_t \sum_{S\in S_t} b_S^k \geq 1, \forall k, t$$

is used to restrict that each sequence can select at least one bounding box and contour in the input video.

Particularly, L(A,B) is a loss function, indicating a confidence coefficient of the selected object bounding boxes and object contours wherein, the confidence for each bounding box or object contour takes a value from 0 to 1, the confidence values are obtained from the output of the used object detectors. Generally speaking, the loss function of L(A,B) is particularly indicated by Formula (3):

$$fL(A, B) = -\sum_{t,k} \sum_{D\in D_t} \sum_{S\in S_t} \xi(Df, S) a_D^k b_S^k \qquad (3)$$

wherein, the expression of ξ(Df,S) is indicated by Formula (4):

$$\xi(Df, S) = \begin{cases} \pi(D, S)\log\left(\frac{r(D)o(S)}{1 - r(D)o(S)}\right), & \text{if } D \neq D_\phi \\ 0, & \text{otherwise} \end{cases} \qquad (4)$$

Wherein, $$\pi(R_1, R_2) = \frac{|R_1 \cap R_2|}{|R_1 \cup R_2|}$$

in Formula (4) indicates an area overlapping ratio between region $R_1$ and region $R_2$ (i.e., a ratio of an intersected area to a unioned area between region $R_1$ and region $R_2$), o(S) indicates an objectness score of contour S as the outcome of the object contour detector, r(D) indicates a confidence score of bounding box D as the transferred outcome of the object bounding box detector; r(D) is calculated by Formula (5):

$$r(D) = \frac{1}{1 + \exp\left(-\frac{1}{1.5\lambda_d}(\hat{r}(D) - \gamma)\right)} \qquad (5)$$

In Formula (5), r̂(D) is a confidence score of object bounding box D given by the object bounding box detector, γ is an optimal threshold of the object bounding box detector, $\lambda_d$ is an average value of all the object bounding box scores (r̂(D)−γ).

$\Omega_1(A,B)$ is a penalty term, indicating a time domain smoothness of the selected object bounding boxes and object contours on adjacent t-th frame and t+1-th frame of the input video, a formalized expression is Formula (6):

$$\Omega_1(A, B) = \sum_{t,k} \sum_{\substack{D\in D_t \\ S\in S_t}} \sum_{\substack{D_0\in D_{t+1} \\ S_0\in S_{t+1}}} \eta(D, S, D_0, S_0) a_D^k b_S^k a_{D_0}^k b_{S_0}^k \qquad (6)$$

wherein, the specific expression of η(D,S,D₀,S₀) is Formula (7):

$$\eta(D, S, D_0, S_0) = \frac{\chi^2(f(S), f(S_0))}{1 + \pi(\overline{D}, D_0)\pi(\overline{S}, S_0)} \qquad (7)$$

Particularly, f(S) is a feature vector indicating the appearance of contour S, and is expressed as a concatenation between Hue color histogram and 64-dimensional texton histogram, $\chi^2$ indicates the Chi-Square distance between Hue color histogram and 64-dimensional texton histogram. $\overline{D}$ and $\overline{S}$ indicate the projected region of D and S from the t-th frame to the t+1-th frame by an optical flow matching algorithm, bounding box $D_0$ is included in a candidate object bounding box set $D_{t+1}$ of the t+1-th frame, contour $S_0$ is included in a candidate object contour set $S_{t+1}$ of the t+1-th frame.

The penalty term of $\Omega_2(B)$ indicates the overlap degree of the candidate object contour sets selected between different sequences, which is particularly indicated by Formula (8):

$$\Omega_2(B) = \sum_{t,k} \sum_{k\neq k_0} \sum_{S,S_0\in S_t} b_S^k b_{S_0}^{k_0} \pi(S, S_0) \qquad (8)$$

When calculating the penalty term of $\Omega_2(B)$, both contours S and $S_0$ are from the candidate object contour set $S_t$ of the t-th frame.

Step 302, Converting the problem of solving the initial segmenting sequence corresponding to the object into a problem of solving minimal cost-maximal flow.

Since the joint assignment model containing the candidate object bounding box set and the candidate object contour set constructed as above contains tens of thousands of binary variables and complicated inequality constraints, it is difficult to be solved with common optimization methods, therefore, embodiments of the present invention convert the problem of solving the initial segmenting sequence corresponding to the object into a problem of solving minimal cost-maximal flow of a network flow.

Particularly, the first optimization objective function expression $$\min_{A,B}\{L(A, B) + \lambda_1\Omega_1(A, B) + \lambda_2\Omega_2(B)\}$$

can be converted to the equivalent objective function $$\min_{\delta_x,\delta_y,K} \{-\xi^T\delta_x + \lambda_1\eta^T\delta_y + \lambda_2\delta_x^T\Pi\delta_x\},$$

by substituting $$\sum_k a_D^k b_S^k$$

with an auxiliary variable $\delta_x(D, S)s$, and $\sum_k a_D^k a_{D_0}^k b_S^k b_{S_0}^k$ with $\delta_y(D, D_0, S, S_0)$;

wherein, $\xi$, $\eta$, $\delta_x$, $\delta_y$ are all column vectors, used to record variables relevant to all the bounding boxes and contours respectively; the matrix $\Pi$ is used to record an overlapping region between contours; the auxiliary variable $\delta_x(D,S)$ is used to indicate an activated status of a node represented by a combination $(D,S)$, auxiliary variable $\delta_y(D,D_0,S,S_0)$ is used to indicate an activated status of an edge of a node for connecting the combination $(D,S)$ and the combination $(D_0,S_0)$, $D_0 \in D_{t+1}$ indicates that $D_0$ belongs to the candidate object bounding box set $D_{t+1}$ of the t+1-th frame of the input video, $S_0 \in S_{t+1}$ indicates that $S_0$ belongs to the candidate object bounding box set $S_{t+1}$ of the t+1-th frame of the input video, the $$\min_{\delta_x, \delta_y, K} \{-\xi^T \delta_x + \lambda_1 \eta^T \delta_y + \lambda_2 \delta_x^T \Pi \delta_x\}$$

indicates a second optimization object function expression with an optimization object of minimal cost-maximal flow.

Step 303, Solving $K_{max}$ initial sequences satisfying the problem of minimal cost-maximal flow;

Since the second optimization object function expression indicating the minimal cost-maximal flow problem contains a quadratic term, the minimal cost-maximal flow algorithm cannot be used directly to solve the initial segmenting sequence, therefore, when solving the above problem based on the minimal cost-maximal flow algorithm, the quadratic term is ignored first, and then the second optimization object function expression is simplified to $$\min_{\delta_x, \delta_y, K} \{-\xi^T \delta_x + \lambda_1 \eta^T \delta_y\}.$$

Therefore, the process to solve $K_{max}$ initial sequences satisfying the problem of minimal cost-maximal flow includes:

Firstly, the network flow is solved with the minimal cost-maximal flow algorithm to obtain a sequence; secondly, the bounding box and contour (and relevant edges thereof) selected by the sequence are removed from the original network flow, to obtain an updated network flow. This process is repeated until the newly-added sequence triggers one of the following cases: one is that a constraint condition of the optimization problem is not satisfied; the other is that the objective function value increases.

In all the obtained sequences, sequences with a length less than 5 frames are discarded, to obtain $K_{max}$ sequences as an initial solution for the minimal cost-maximal flow problem of the network flow.

Step 304, Re-selecting an object contour of the first K initial sequences in the $K_{max}$ initial sequences respectively with a K shortest path algorithm, to obtain K candidate sequence sets;

Assuming that the number K of the candidate sequence is known ($1 \leq K \leq K_{max}$), in terms of each sequence among the first K initial sequences, maintain the selected candidate object bounding box unchanged, and re-select the object contour with the K Shortest Path algorithm, to obtain K candidate sequence sets consisting of M new sequences and the original K initial sequences. Wherein, M can be any positive integer, the bigger the value of M is, the better the segmentation result may be, and M is usually set to be M=100 in the experiment.

Step 305, Optimization on the selection status of each candidate sequence with 0-1 variable for each candidate sequence in K candidate sequence sets through 0-1 quadratic programming;

Select one candidate sequence respectively from each of the K candidate sequence sets, so that the newly-selected K candidate sequence sets make the optimization object of the original network flow minimal.

Let $\mu \in \{0,1\}^{MK}$ indicate selection statuses of all the candidate sequences in the K candidate sequence sets, wherein, 1 indicates to be selected while 0 indicates not to be selected, then the problem of solving minimal cost-maximal flow of the network flow is converted into a problem of solving 0-1 quadratic programming, which is indicated by Formula (9):

$$\min_{\mu} (\mu^T s + \mu^T A \mu) \tag{9}$$

The constraint condition is $C\mu=1$.

Particularly, each component of column vector S records a loss function value and a time domain smoothness penalty function value of a corresponding sequence, matrix A records a sum of the overlapping areas between any of the two sequences, and constraint matrix $C \in \{0,1\}^{K \times MK}$ defines that the sum of selecting status variable of sequences in each candidate set is 1.

Step 306, Solving the problem of 0-1 quadratic programming with an optimizer, to obtain the initial segmenting sequence corresponding to the object.

The above problem of quadratic programming can be solved with a common optimizer, such as Gurobi optimizer.

In terms of each K value satisfying $1 \leq K \leq K_{max}$, candidate sequence of the object and object function values of a first optimization object function expression taking the initial segmenting sequence corresponding to the object as the optimization object can be solved by applying step 303. Select a K* making the object function value minimal and take this sequence as a final solution for the first optimization object function expression, and select the optimal contour sequence as the initial segmenting sequence corresponding to the object.

By means of Step 301 to Step 306, the initial segmenting sequence corresponding to the object of a given semantic category can be obtained, and the initial segmenting sequence can roughly locate the object of a given semantic category in the input video, and lay the foundation for subsequently solving the optimal segmenting sequence corresponding to the object.

In the method for segmenting video objects tagged with semantic labels according to Embodiment 3 of the present invention, the object tagged with a given semantic category can be selected from a disorder candidate object bounding box set and candidate object contour set, by building the joint allocation model containing the candidate object bounding box set and the candidate object contour set, and the problem of solving the initial segmentation sequence of the object is expressed with the first object function expression, the problem of solving the initial segmenting sequence corresponding to the object is converted into a problem of solving minimal cost-maximal flow, and the initial segmenting sequence corresponding to the object of a given semantic category in the input video is finally solved with a minimal cost-maximal flow algorithm and 0-1 quadratic programming local search. However, since that the object bounding box and contour detector are applied individually for each video frame, the initial segmentation may be inconsistent on different video frames. To address this problem, consistent spatiotemporal shape probability distribution is further estimated from the initial segmentation sequence.

Figure 4:
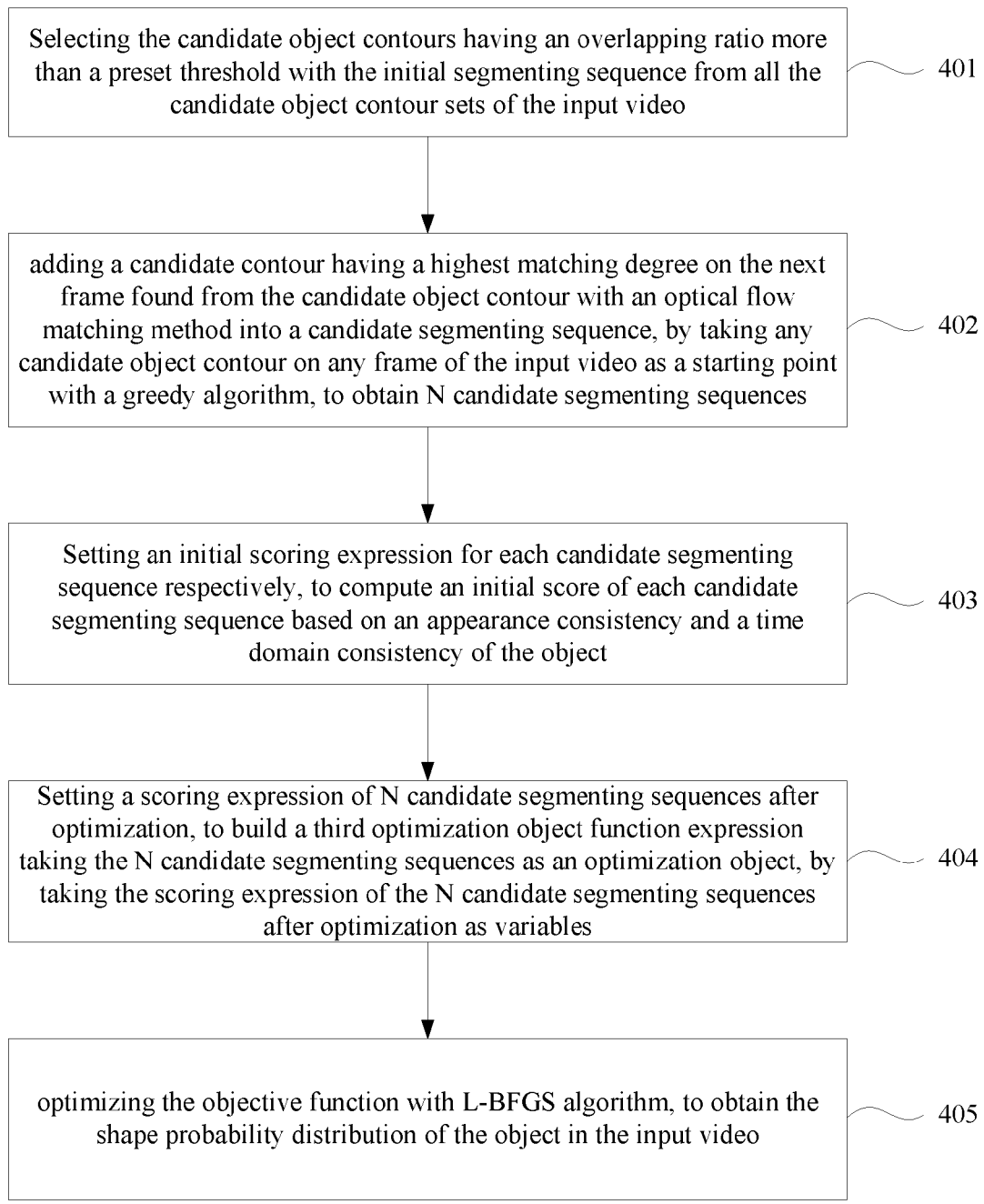
FIG. 4 is a flow chart of the method for segmenting video objects tagged with semantic labels according to Embodiment 4 of the present invention.

FIG. 4 is a flow chart of the method for segmenting video objects tagged with semantic labels according to Embodiment 4 of the present invention. Embodiment 4 of the present invention is to further discuss Step 103 on the basis of the technical solution of Embodiment 1. As shown in FIG. 4, the method for segmenting video objects tagged with semantic labels according to Embodiment 4 of the present invention, the Step 103, that is, processing the initial segmenting sequence, to estimate a shape probability distribution of the object in the input video, specific implementation steps include:

Step 401, Selecting the candidate object contours having an overlapping ratio more than a preset threshold with the initial segmenting sequence from all the candidate object contour sets of the input video;

Particularly, in all the candidate object contours of the input video, keep candidate object contours having an overlapping ratio more than a preset threshold with the initial segmenting sequence, and remove candidate object contours having an overlapping ratio less than the preset threshold. The preset threshold is set at will as required by the user, and is generally 50%.

Step 402, adding a candidate contour having a highest matching degree on the next frame found from the candidate object contour with an optical flow matching method into a candidate segmenting sequence, by taking any candidate object contour on any frame of the input video as a starting point with a greedy algorithm, to obtain N candidate segmenting sequences;

In detail, this step is to construct N candidate segmentation sequences from the candidate object contours having an overlapping ratio more than the preset threshold with a greedy algorithm, the specific construction method is that: search and add a candidate contour having a highest matching degree on the next frame with an optical flow matching method into a candidate segmenting sequence, by taking a certain candidate object contour on a certain frame of the input video as a starting point of the segmenting sequence, and this process is repeated until one of the following two cases is satisfied: one is that the final frame of the input video is arrived; the other is that the overlapping degree of the projected region between any candidate contour on the next frame and the current candidate contour is less than a preset threshold. The preset threshold is optionally 50%.

According to the method described above, after constructing the candidate segmenting sequence, removing the candidate contour selected by the candidate segmenting sequence, and repeatedly constructing the candidate segmenting sequence for the remaining candidate contours until all the candidate contours are selected, and thereby construct N candidate segmentation sequences.

Step 403, Setting an initial scoring expression for each candidate segmenting sequence respectively, to compute an initial score of each candidate segmenting sequence based on an appearance consistency and a time domain consistency of the object;

Particularly, denote the r-th candidate segmenting sequence as $\{S_{r,l}\}_{l=1}^{L_r}$, wherein, $L_r$ is the length of the r-th candidate segmenting sequence, $1 \le r \le N$, then, the initial score of the r-th candidate segmentation is expressed as Formula (10):

$$\alpha_r^0 = \sum_{l=1}^{L_r} o(S_{r,l}) + \sum_{l=1}^{L_r-1} e^{-\frac{1}{\lambda_f} \chi^2(f(S_{r,l}), f(S_{r,l+1}))} \tag{10}$$

Wherein, $\lambda_f$ is an average value of all the values $\chi^2(f(S_{r,l}), f(S_{r,l+1}))$;

Step 404, Setting a scoring expression of N candidate segmenting sequences after optimization, to build a third optimization object function expression taking the N candidate segmenting sequences as an optimization object, by taking the scoring expression of the N candidate segmenting sequences after optimization as variables;

Optionally, denote the re-calculated scores of the N candidate segmentation sequences after optimization as $\alpha = \{\alpha_r\}_{r=1}^N$, then the objective function to re-calculate the scores of candidate segmentation sequences by taking the appearance and temporal consistency into account can be expressed as Formula (11):

$$\min_{0 \le \alpha \le 1} \left\{ \sum_{r=1}^N (\alpha_r - \alpha_r^0)^2 + \theta_1 C_1(\alpha) + \theta_2 C_2(\alpha) \right\} \tag{11}$$

Wherein, $$\sum_{r=1}^N (\alpha_r - \alpha_r^0)^2$$

is a loss function, configured to restrict the deviations between the re-calculated scores and the initial scores; $C_1(\alpha)$ and $C_2(\alpha)$ are penalty terms, $C_1(\alpha)$ is used to represent the appearance consistency of scoring between candidate segmentation sequences; $C_2(\alpha)$ is used to represent temporal consistency of scoring between candidate segmentation sequences; $\theta_1$ and $\theta_2$ are parameters of $C_1(\alpha)$ and $C_2(\alpha)$ respectively.

Optionally, parameters of $\theta_1$ and $\theta_2$ are set to be $\theta_1 = \theta_2 = 1.5$.

Formula (11) is to avoid the re-calculated scores from deviating the initial scores too much, while enforcing appearance and temporal consistencies between the re-calculated scores.

Particularly, the appearance consistency penalty term $C_1(\alpha)$ is expressed by Formula (12):

$$C_1(\alpha) = \sum_{r=1}^N \sum_{s \in R_r} w_{r,s} (\alpha_r - \alpha_s)^2 \tag{12}$$

Wherein, weight $w_{r,s} = e^{-dist(r,s)}$ is a similarity between the r-th candidate segmenting sequence and the s-th candidate segmenting sequence, dist(r,s) is the Hausdorff distance of contour features between the r-th candidate segmenting sequence and the s-th candidate segmenting sequence, $R_r$ is the set of candidate segmentation sequences whose feature distances between the r-th candidate segmentation sequence are below a given threshold. The appearance consistency penalty term $C_1(\alpha)$ can make the scores of the candidate sequences with similar appearance as close as possible.

The time domain consistency penalty term $C_2(\alpha)$ is expressed by Formula (13):

$$C_2(\alpha) = \sum_{d \in \{1,2\}} \sum_{p=1}^{P} \left( |A_p|\beta_p - \sum_{q \in M_p^d} \omega_{q,p}^d |A_p|\beta_p \right)^2 \quad (13)$$

Wherein, $\{A_p\}_{p=1}^P$ is the set of superpixels, $|A_p|$ indicates the area (number of pixels) of the superpixel $A_p$, $\beta_p$ indicates the score of the superpixel $A_p$, which is calculated by $$\beta_p = \frac{1}{N} \sum_{r \in \Pi_p} \alpha_r,$$

wherein, $\Pi_p$ is the set of candidate segmentation sequences covering the superpixel $A_p$; $M_p^1$ ($M_p^2$) indicates the set of superpixels that are temporally matched to the p-th superpixel by forward (backward) optical flows, $\omega_{q,p}^1$ ($\omega_{q,p}^2$) indicates the proportion of the area of the p-th superpixel that are mapped to the superpixel $A_q \in M_p^1(M_p^2)$. The temporal consistency penalty term $C_2(\alpha)$ is to make the shape probability distribution of adjacent pixels in time domain as close as possible.

Step 405, optimizing the objective function with L-BFGS algorithm, to obtain the shape probability distribution of the object in the input video.

After solving the objective function $$\min_{0 \leq \alpha \leq 1} \left\{ \sum_{r=1}^{N} (\alpha_r - \alpha_r^0)^2 + \theta_1 C_1(\alpha) + \theta_2 C_2(\alpha) \right\}$$

with the L-BFGS algorithm, to obtain the optimal solution $\alpha^*$, the shape probability of each pixel is the averaged score of the candidate segmenting sequence covering the pixel, and thus the shape probability distribution of the object in the input video can be obtained.

In the method for object segmentation in videos tagged with semantic labels according to Embodiment 4 of the present invention, the initial segmentation sequence is processed under the joint constraints of the appearance consistency penalty term and the time domain consistency penalty term, the appearance consistency penalty term can effectively enhance the shape probability values of the segmentation sequences corresponding to the objects, the time domain consistency penalty term can reduce the effect of background noise based on video interframe relationship and obtain a visually more consistent shape probability distribution of the object.

Figure 5:
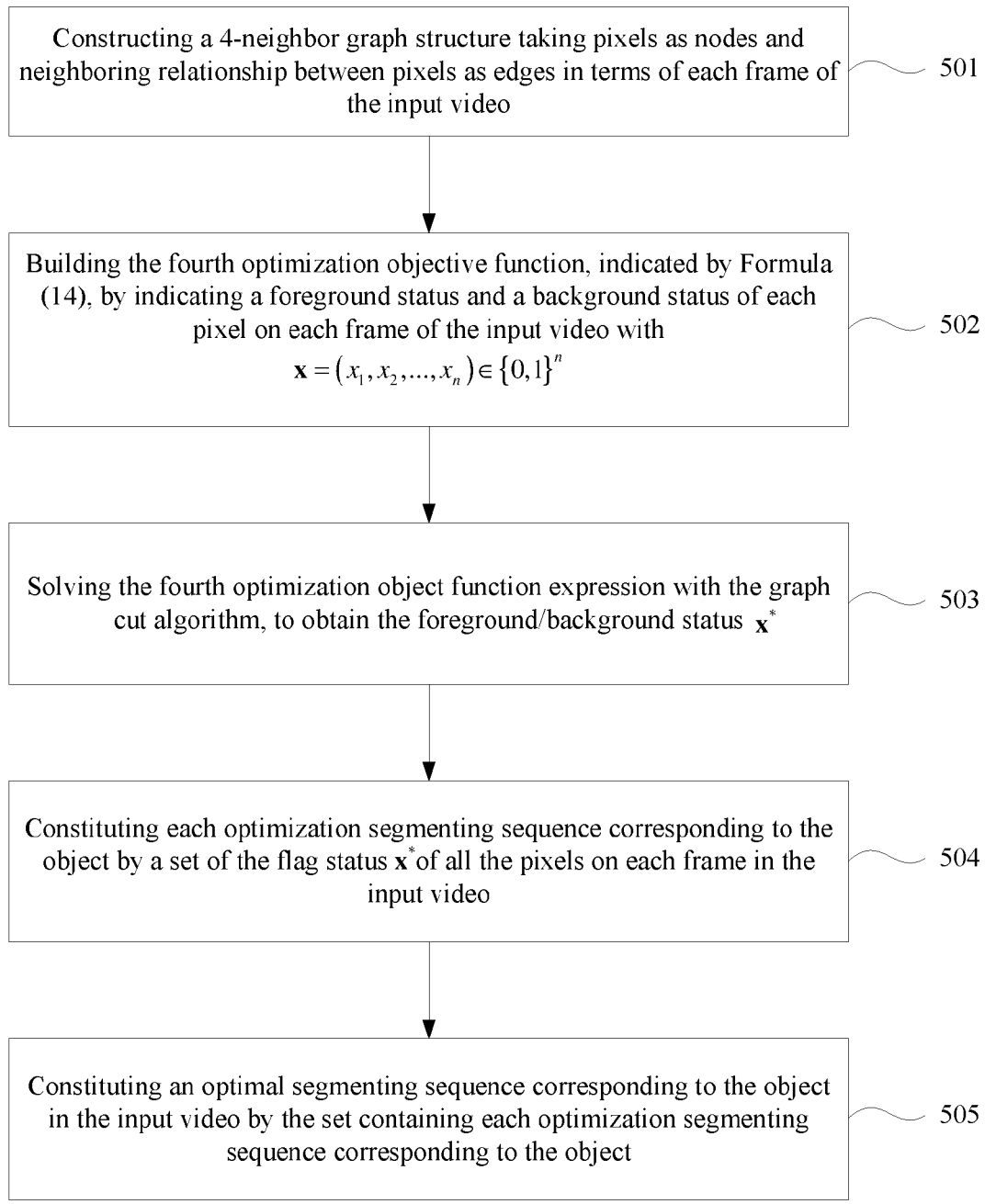
FIG. 5 is a flow chart of the method for segmenting video objects tagged with semantic labels according to Embodiment 5 of the present invention.

FIG. 5 is a flow chart of the method for segmenting video objects tagged with semantic labels according to Embodiment 5 of the present invention. Embodiment 5 of the present invention is to further discuss Step 104 on the basis of the technical solutions of Embodiment 1 to Embodiment 4. As shown in FIG. 5, the method for object segmentation in videos tagged with semantic labels according to Embodiment 5 of the present invention, the Step 104, that is, optimizing each sequence containing the object in sequence with graph cut algorithm in combination with the shape probability distribution of the object, to obtain an optimal segmenting sequence corresponding to the object in the input video, specific implementation steps include:

Step 501, Constructing a 4-neighbor graph structure G={V,E} taking pixels as nodes and neighboring relationship between pixels as edges in terms of each frame of the input video;

wherein, V is a node set, E is an edge set;

Step 502, Building the fourth optimization objective function, indicated by Formula (14), by indicating a foreground status and a background status of each pixel on each frame of the input video with $x=(x_1, x_2, \ldots, x_n) \in \{0,1\}^n$;

$$\min_x E(x) = \sum_{i \in V} u_i(x_i) + \sum_{(i,j) \in E} v_{ij}(x_i, x_j) \quad (14)$$

The optimization objective of the fourth optimization object function expression is to obtain the best foreground/background status x* so that the pixel can be segmented into a foreground and a background and a local smoothness of the candidate segmenting sequence can be maintained;

wherein, $u_i$ indicates a data item with a definition formula indicated by Formula (15):

$$u_i(x_i) = -\rho \log(A(x_i)) + (1-\rho)\log(S(x_i)) \quad (15)$$

In the formula, $A(x_i)$ is the foreground probability given by a Gaussian mixture model, indicating the foreground object appearance of the i-th pixel, $S(x_i)$ is a shape probability of the i-th pixel solved in Step 103; particularly, Gaussian mixture models of the foreground and the background are learned from the foreground pixels and background pixels determined by the initial segmenting sequence respectively.

$v_i$ is the smoothing item, defined by a contrast sensitive Potts model (Contrast Sensitive Potts Model) commonly used in the graph cut algorithm.

Step 503, Solving the fourth optimization object function expression with the graph cut algorithm, to obtain the foreground/background status x*;

Particularly, the optimization objective can be solved quickly with the graph cut (Graph Cut) algorithm.

Step 504, Constituting each optimization segmenting sequence corresponding to the object by a set of the flag status x* of all the pixels on each frame in the input video;

Step 505, Constituting an optimal segmenting sequence corresponding to the object in the input video by the set containing each optimization segmenting sequence corresponding to the object.

After individual optimization of each initial segmentation sequence containing the object with steps according to Embodiment 5 of the present invention, the determined foreground regions may be overlapped. To solve this problem, the present invention further provides a simple processing method, that is, extract the appearance feature (color histogram and texton histogram) of the overlapping region first, and then compare it with foreground region of each segmenting sequence closest to the overlapping region under Chi-Square distance measure, and assign the semantic category of the segmentation sequence with the minimum feature distance to the overlapping region.

In the method for object segmentation in videos tagged with semantic labels according to Embodiment 5 of the present invention, the foreground status and the background status of each pixel on each frame of the input video are indicated with one optimization objective function expression by constructing the 4-neighbor graph structure, and an optimal segmenting sequence corresponding to the object in the input video is obtained by solving with the graph cut algorithm, so as to achieve segmentation of the object of a given semantic category.

In the method for object segmentation in videos tagged with semantic labels according to Embodiment 1 to Embodiment 5 of the present invention, firstly, an object bounding box detector and an object contour detector are applied to roughly estimate the locations of the object of a given semantic category, so that the problem of ambiguous sample selection and classification under weakly-supervised learning condition can be avoided, secondly, a joint assignment model containing the candidate object bounding box set and the candidate object contour set is built, so that the object bounding boxes and contours that best cover the objects to be segmented can be selected from the set of noisy, inaccurate object bounding box and contour candidates, and finally, the initial segmentation sequence of the object in the input video is optimized in combination with the shape probability distribution of the object, to make the obtained optimal segmentation sequence of the object more accurate and spatiotemporally consistent. Further, the method for object segmentation in videos tagged with semantic labels according to the present invention is applicable to segmenting an object of a semantic category of a single input video, not having to process multiple videos at the same time, and thus has a better applicability.

The method for object segmentation in videos tagged with semantic labels according to the present invention is widely applicable to semantic parsing of video contents in a computer vision system in the fields such as national defense and military, film-making and public safety.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for object segmentation in videos tagged with semantic labels, comprising:
   detecting each frame of a video sequence with an object bounding box detector from a given semantic category and an object contour detector according to a semantic category label to which an object belongs, and obtaining a candidate object bounding box set and a candidate object contour set for each frame of the input video;
   building a joint assignment model for the candidate object bounding box set and the candidate object contour set, and solving the model to obtain the initial object segment sequence, wherein the initial segmenting sequence is at least one sequence containing the object;
   processing the initial object segment sequence, to estimate a probability distribution of the object shapes in the input video; and
   optimizing the initial object segment sequence with a variant of graph cut algorithm that integrates the shape probability distribution of the object, to obtain an optimal segment sequence.

2. The method for object segmentation in videos tagged with semantic labels according to claim 1, wherein the detecting each frame of the video sequence with the object bounding box detector from a given semantic category and the object contour detector, and obtaining the candidate object bounding box set and the candidate object contour set for each frame of the input video, particularly comprises:
   detecting each frame of the input video with the object bounding box detector on at least two thresholds according to the semantic category label to which the object belongs, to calculate a comprehensive performance value of the detection result corresponding to the at least two thresholds, and take a threshold corresponding to a maximum comprehensive performance value selected form the comprehensive performance values as an optimal threshold of the object bounding box detector;
   detecting each frame of the input video with the object bounding box detector on the optimal threshold according to the semantic category label to which the object belongs, to obtain an object bounding box set for each frame of the input video, wherein, a final object bounding box set is a union of the object bounding box set for each frame of the input video and a dummy bounding box;
   detecting each frame of the input video with an object contour detector based on constrained parametric min-cuts (CPMC) after obtaining the candidate object bounding box set for each frame of the input video, to obtain a candidate object contour set for each frame of the input video.

3. The method for object segmentation in videos tagged with semantic labels according to claim 1, wherein the building the joint assignment model for the candidate object bounding box set and the candidate object contour set, and solving the model to obtain the initial object segment sequence, particularly comprises:
   building a first optimization objective function which targets at obtaining the initial object segment sequence corresponding to the object as the optimization object, by setting an allocated 0-1 variable set indicating the candidate object bounding box set and the candidate object contour set respectively;
   converting the problem of solving the initial segmenting sequence corresponding to the object into a problem of solving minimal cost-maximal flow of a network flow, by indicating a combination of the candidate object bounding box set and the candidate object contour set with a network flow node;
   solving $K_{max}$ initial sequences satisfying the problem of minimal cost-maximal flow;
   re-selecting an object contour of the first K initial sequences in the $K_{max}$ initial sequences respectively with a K shortest path algorithm, to obtain K candidate sequence sets;
   optimizing a selecting status of each candidate sequence with 0-1 variable for each candidate sequence in the K candidate sequence sets through 0-1 quadratic programming;

solving the problem of 0-1 quadratic programming with an optimizer, to obtain the initial segmenting sequence corresponding to the object.

4. The method for object segmentation in videos tagged with semantic labels according to claim 3, wherein the building the first optimization objective function which targets at obtaining the initial object segment sequence corresponding to the object as the optimization object, by setting the allocated 0-1 variable set indicating the candidate object bounding box set and the candidate object contour set respectively, particularly comprises:

setting a set $A=\{a_D^k | \forall k,t, D \in D_t\}$ for the candidate object bounding box set, wherein $D_t$ indicates a candidate object bounding box set of the t-th frame of the input video, $a_D^k \in \{0,1\}$, when $a_D^k$ takes a value of 1, it means the bounding box D is assigned to the k-th sequence, and when $a_D^k$ takes a value of 0, it means the bounding box D is not assigned to the k-th sequence;

setting a set $B=\{b_S^k | \forall k,t, S \in S_t\}$ for the candidate object contour set, wherein $S_t$ indicates a candidate object contour set of the t-th frame of the input video, $b_S^k \in \{0,1\}$, when $b_S^k$ takes a value of 1, it means the contour S is assigned to the k-th sequence, and when $b_S^k$ takes a value of 0, it means the contour S is not assigned to the k-th sequence;

building a first optimization objective function taking the initial segment sequence corresponding to the object as the optimization object, $$\min_{A,B}\{L(A,B) + \lambda_1 \Omega_1(A,B) + \lambda_2 \Omega_2(B)\},$$

by taking the set A and the set B as variables, constraint conditions are:

$$\begin{cases} a_D^k, b_S^k \in \{0,1\}, \forall k, t, D \in D_t, S \in S_t \\ \sum_{D \in D_t} a_D^k = \sum_{S \in S_t} b_S^k \leq 1, \forall k, t \\ \sum_k a_D^k \leq 1, \sum_k b_S^k \leq 1, \forall t, D \in D_t, S \in S_t \\ \left(\sum_{D \in D_{t-m}} a_D^k\right)\left(1 - \sum_{D \in D_t} a_D^k\right)\left(\sum_{D \in D_{t+m}} a_D^k\right) = 0, \forall k, t, m, n \\ \sum_t \sum_{D \in D_t} a_D^k = \sum_t \sum_{S \in S_t} b_S^k \geq 1, \forall k, t \end{cases};$$

wherein, L(A,B) is a loss function, indicating a confidence coefficient of the selected candidate object bounding box set $D_t$ and candidate object contour set $S_t$; $\Omega_1(A,B)$ is a penalty term, indicating a time domain smoothness of the selected candidate object bounding box sets and candidate object contour sets on two adjacent frames of the input video; $\Omega_2(B)$ is a penalty term, indicating a spatial overlap among the selected candidate object contour sets in different sequences; $\lambda_1$ is a parameter of the penalty term of $\Omega_1(A,B)$, and $\lambda_2$ is a parameter of the penalty term of $\Omega_2(B)$;

the constraint condition of $a_D^k, b_S^k \in \{0,1\}$, $\forall k,t, D \in D_t, S \in S_t$ is used to restrict value ranges of the variable $a_D^k$ of the set A and the variable $b_S^k$ of the set B;

the constraint condition of $$\sum_{D \in D_t} a_D^k = \sum_{S \in S_t} b_S^k \leq 1, \forall k, t$$

is used to restrict that each sequence can select at most one bounding box or contour on each frame of the input video;

the constraint condition of $$\sum_k a_D^k \leq 1, \sum_k b_S^k \leq 1, \forall t, D \in D_t, S \in S_t$$

is used to restrict that each bounding box or contour is assigned to at most one sequence;

the constraint condition of $$\left(\sum_{D \in D_{t-m}} a_D^k\right)\left(1 - \sum_{D \in D_t} a_D^k\right)\left(\sum_{D \in D_{t+m}} a_D^k\right) = 0, \forall k, t, m, n$$

is used to restrict the consecutiveness of the sequence, provided that the sequence must select a bounding box or contour on a continuous video frame; and the constraint condition of $$\sum_t \sum_{D \in D_t} a_D^k = \sum_t \sum_{S \in S_t} b_S^k \geq 1, \forall k, t$$

is used to restrict that each sequence can select at least one bounding box and contour in the input video.

5. The method for object segmentation in videos tagged with semantic labels according to claim 4, wherein the converting the problem of solving the initial segmenting sequence corresponding to the object into the problem of solving minimal cost-maximal flow of the network flow, by indicating the combination of the candidate object bounding box set and the candidate object contour set with the network flow node, particularly comprises:

converting the first optimization objective function expression $$\min_{A,B}\{L(A,B) + \lambda_1 \Omega_1(A,B) + \lambda_2 \Omega_2(B)\}$$

to a second optimization objective function expression $$\min_{\delta_x, \delta_y, K}\{-\xi^T \delta_x + \lambda_1 \eta^T \delta_y + \lambda_2 \delta_x^T \Pi \delta_x\},$$

by substituting $$\sum_k a_D^k b_S^k \text{ with } \delta_x(D,S)s, \text{ and } \sum_k a_D^k a_{D_0}^k b_S^k b_{S_0}^k \text{ with } \delta_y(D, D_0, S, S_0);$$

wherein, $\epsilon$, $\eta$, $\delta_x$, $\delta_y$ are all column vectors, used to record variables relevant to all the bounding boxes and contours respectively; the matrix $\Pi$ is used to record an overlapping region between contours; the $\delta_x(D,S)$ is used to indicate an activated status of a node represented by a combination (D,S), $\delta_y(D,D_0,S,S_0)$ is used to indicate an activated status of an edge of a node for connecting the combination (D,S) and the combination $(D_0,S_0)$, $D_0 \in D_{t+1}$ indicates that $D_0$ belongs to the candidate object bounding box set $D_{t+1}$ of the t+1-th frame of the input video, $S_0 \in S_{t+1}$ indicates that $S_0$ belongs to the candidate object bounding box set $S_{t+1}$ of the t+1-th frame of the input video, the $$\min_{\delta_x,\delta_y,K} \{-\xi^T \delta_x + \lambda_1 \eta^T \delta_y + \lambda_2 \delta_x^T \Pi \delta_x\}$$

indicates a second optimization object function expression with an optimization object of minimal cost-maximal flow.

6. The method for object segmentation in videos tagged with semantic labels according to claim 1, wherein the processing the initial object segment, to estimate the probability distribution of the object shapes in the input video, particularly comprises:

selecting a candidate object contour having an overlapping ratio more than a preset threshold with the initial segmenting sequence from all the candidate object contour sets of the input video;

adding a candidate contour having a highest matching degree on the next frame found from the candidate object contour with an optical flow matching method into a candidate object segmenting sequence, by taking any candidate object contour on any frame of the input video as a starting point with a greedy algorithm, to obtain N candidate segmenting sequences;

setting an initial scoring expression for each candidate segmenting sequence respectively, to calculate an initial scoring of each candidate segmenting sequence based on an appearance consistency and a time domain consistency of the object;

setting a scoring expression of N candidate segmenting sequences after optimization, to build a third optimization object function expression taking the N candidate segmenting sequences as an optimization object, by taking the scoring expression of the N candidate segmenting sequences after optimization as variables;

optimizing the third objective function with an L-BFGS algorithm, to obtain a shape probability distribution of the object in the input video.

7. The method for object segmentation in videos tagged with semantic labels according to claim 6, wherein setting an expression of the r-th candidate segmenting sequence as $\{S_{r,l}\}_{l=1}^{L_r}$, wherein, $L_r$ is a length of the r-th candidate segmenting sequence, $1 \le r \le N$;

setting an initial scoring calculation expression of the r-th candidate segmenting sequence based on the appearance consistency and the time domain consistency of the object as $$\alpha_r^0 = \sum_{l=1}^{L_r} o(S_{r,l}) + \sum_{l=1}^{L_r-1} e^{-\frac{1}{\lambda_f} \chi^2(f(S_{r,l}),f(S_{r,l+1}))},$$

wherein, $\lambda_f$ is an average of all the values $\chi^2(f(S_{r,l}),f(S_{r,l+1}))$;

setting a scoring expression of the N candidate segmenting sequences after optimization as $\alpha = \{\alpha_r\}_{r=1}^N$, to build a third optimization object function expression $$\min_{0 \le \alpha \le 1} \left\{ \sum_{r=1}^N (\alpha_r - \alpha_r^0)^2 + \theta_1 C_1(\alpha) + \theta_2 C_2(\alpha) \right\}$$

taking the N candidate segmenting sequences as an optimization object, by taking $\alpha = \{\alpha_r\}_{r=1}^N$ as variables; wherein, $$\sum_{r=1}^N (\alpha_r - \alpha_r^0)^2$$

is a loss function, configured to restrict a deviation between a scoring of the r-th candidate segmenting sequence after optimization and an initial scoring; $C_1(\alpha)$ and $C_2(\alpha)$ are penalty terms, $C_1(\alpha)$ is used to restrict an appearance consistency of scoring between candidate segmenting sequences after optimization; $C_2(\alpha)$ is used to restrict a time domain consistency of scoring between candidate segmenting sequences after optimization; $\theta_1$ and $\theta_2$ are parameters of $C_1(\alpha)$ and $C_2(\alpha)$ respectively.

8. The method for object segmentation in videos tagged with semantic labels according to claim 1, wherein the optimizing the initial object segment sequence with the variant of graph cut algorithm that integrates the shape probability distribution of the object, to obtain the optimal segmenting sequence, particularly comprises:

constructing a 4-neighbor graph structure $G=\{V,E\}$ taking pixels as nodes and neighboring relationship between pixels as edges in terms of each frame of the input video, wherein, V is a node set, E is an edge set;

building a fourth optimization objective function $$\min_x E(x) = \sum_{i \in V} u_i(x_i) + \sum_{(i,j) \in E} v_{ij}(x_i, x_j)$$

by indicating a foreground status and a background status of each pixel on each frame of the input video with $x=(x_1, x_2, \ldots, x_n) \in \{0,1\}^n$, the optimization object is to solve a flag status $x^*$ so that the pixel can be segmented into a foreground and a background and a local smoothness of the candidate segmenting sequence can be maintained; wherein, $u_i$ indicates a data item with a definition formula of $u_i(x_i) = -\rho \log(A(x_i)) + (1-\rho)\log(S(x_i))$, $A(x_i)$ is a foreground probability given by a Gaussian mixture model, indicating a foreground object appearance of the i-th pixel, $S(x_i)$ is a shape probability of the i-th pixel; $v_i$ is a smoothing item, defined by a contrast sensitive Potts model commonly used in the graph cut algorithm;

solving the fourth optimization objective function with the graph cut algorithm, to obtain the flag status $x^*$;

constituting each optimization segment sequence corresponding to the object by a set of the foreground/background status $x^*$ of all the pixels on each frame in the input video;

constituting an optimal segment sequence corresponding to the object in the input video by the set containing each optimization segment sequence corresponding to the object.

* * * * *